US005818183A

United States Patent [19]

Lambert et al.

[11] Patent Number: 5,818,183

[45] Date of Patent: Oct. 6, 1998

[54] BLIND TILT CONTROLLER

[75] Inventors: James Andrew Lambert, Delta; Gregory Alan Weber, Cloverdale; Yu Chiu Kwok, Burnaby, all of Canada

[73] Assignee: Auto-Tilt Enterprises, Ltd., Vancouver, Canada

[21] Appl. No.: 555,642

[22] Filed: Nov. 8, 1995

(Under 37 CFR 1.47)

Related U.S. Application Data

[63] Continuation-in-part of Ser. No. 354,112, Dec. 6, 1994, abandoned.

[51] Int. Cl.[6] ..................... H04Q 9/14

[52] U.S. Cl. ..................... 318/286; 318/256; 318/466; 318/17; 160/310; 49/349

[58] Field of Search ..................... 318/280, 256, 318/480, 16, 17, 469, 250, 265, 266, 267, 282, 284, 283, 286, 466, 467, 468; 160/310, 311, DIG. 17, 168.1, 5, 167, 331; 49/348, 349, 501

[56] References Cited

U.S. PATENT DOCUMENTS

| | | | |
|---|---|---|---|
| 3,646,985 | 3/1972 | Klann | 160/168 |
| 4,492,908 | 1/1985 | Stockle et al. . | |
| 4,550,759 | 11/1985 | Archer . | |
| 4,618,804 | 10/1986 | Iwasaki | 318/480 |
| 4,712,104 | 12/1987 | Kobayashi | 160/310 |
| 4,914,360 | 4/1990 | Hsieh et al. | 160/167 |
| 5,081,402 | 1/1992 | Koleda . | |
| 5,134,347 | 7/1992 | Koleda . | |
| 5,170,108 | 12/1992 | Peterson et al. | 318/469 |
| 5,391,967 | 2/1995 | Domel et al. . | |
| 5,413,161 | 5/1995 | Corazzini . | |

*Primary Examiner*—John W. Cabeca
*Attorney, Agent, or Firm*—Myers, Liniak & Berenato

[57] ABSTRACT

A device for controlling the tilt angle of window blind blades having a motor with an output shaft and a slip clutch coupling the output shaft to a tilt control mechanism. A receiver and demodulator receives a modulated infra red carrier signal modulated with a code and to demodulate the carrier to produce corresponding electrical pulses. A decoder is coupled to an output of the receiver and demodulator and when powered provides an output on one of several output lines depending upon the coding of pulses from the receiver and demodulator. A motor driver circuit has an input coupled to the decoder and an output coupled to the motor, is operative to drive the motor in either a forward or reverse direction depending upon the output from the decoder, and a decoupler decouples the motor from the wand upon reaching an extreme of tilting of the blade when the motor is still running.

14 Claims, 5 Drawing Sheets

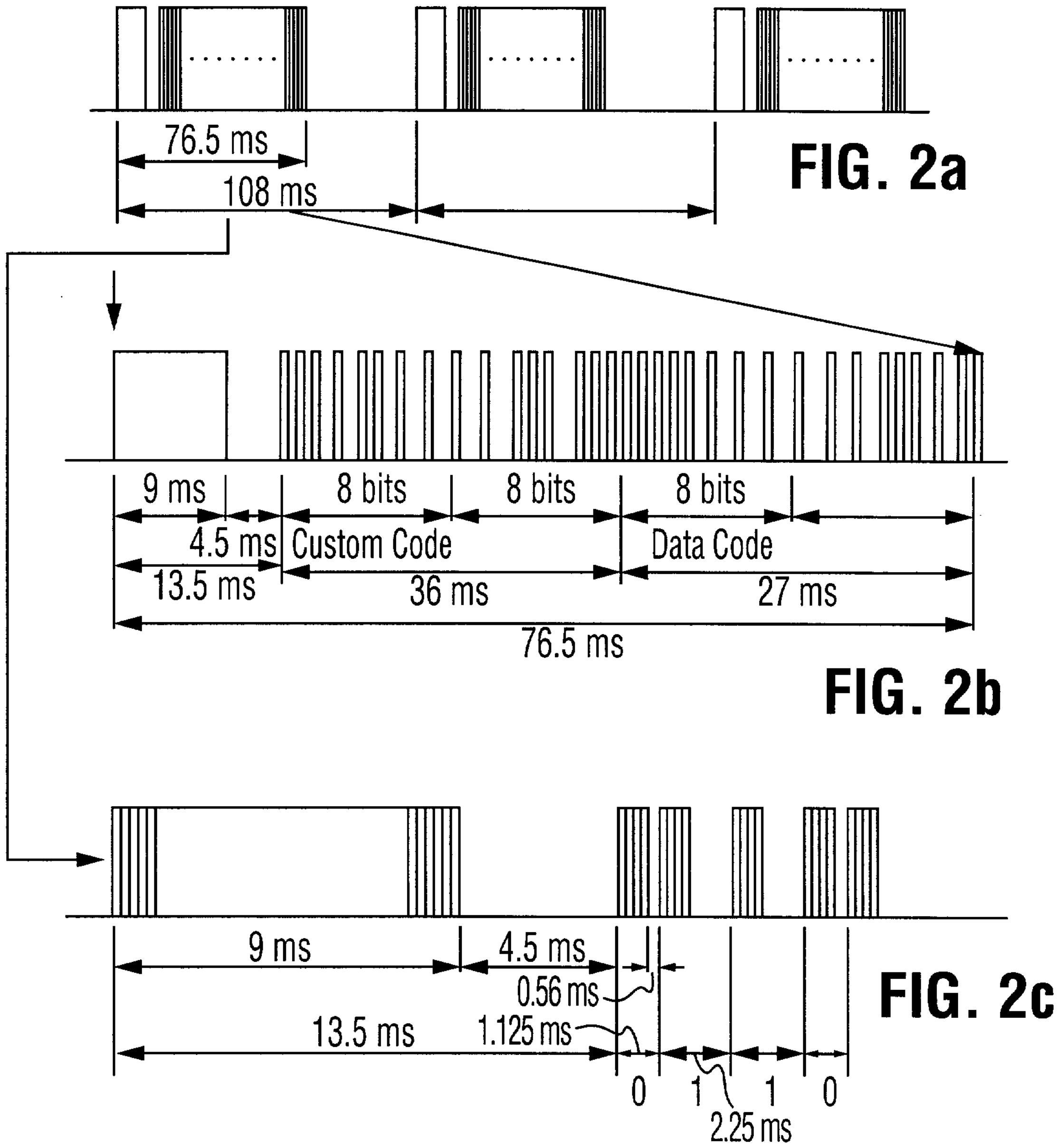
FIG. 2a
FIG. 2b
FIG. 2c
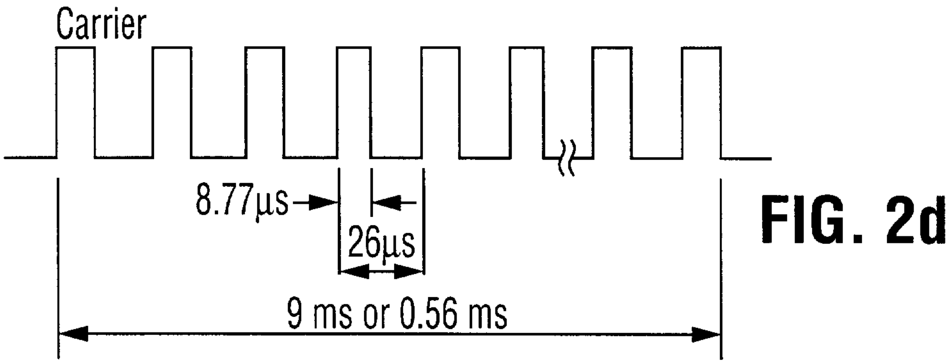
FIG. 2d

BLIND TILT CONTROLLER

FIELD

This is a Continuation-In-Part Application of U.S. patent application Ser. No. 08,354,112, filed Dec. 6, 1994, now abandoned. The present invention relates to a blind tilt controller for rotating the blades of a blind from an open to a closed position and vice versa.

BACKGROUND

Blinds which are widely used in homes and offices usually have a drawstring to lift the blinds and a rod or pair of cords to rotate the blades or slats of the blinds. While considerable energy is required to lift the blinds only a small amount is needed to rotate the blades. Consequently, many devices have been developed to rotate the blades. Most such devices involve the installation of gears, motors and shafts in the assembly. Such units have tended to be complex and expensive and are not ones which can be sold to the "Do It Yourself" market. Success in the latter market demands a low cost and easy installation.

In order to avoid the need for wiring many devices have been developed which are battery operated. Under ordinary conditions conventional batteries would discharge in a matter of hours and would be impractical. U.S. Pat. Nos. 5,081,402 and 5,134,347 both issued to Koleda disclose a low power consumption circuit for a blind controller which utilizes a remote hand held remote control unit to send control signals to a mounted controller. The circuit has a receiver/detector which has electrical power disconnected from it for predetermined periods of time and then connected. If while connected command pulses are received, then the microprocessor maintains the receiver/detector active. If no command pulses are received, then the receiver/detector is de-activated by the microprocessor to conserve power. The timing between the leading edge of successive pulses is measured and compared against stored values to determine if true command pulses are present. If it is determined that true command pulses are present then a second predetermined time of about 170 msec is set for maintaining the receiver active so as to receive two additional packets of data which, if received, are subsequently decoded. The need to measure the time between pulses and compare that time with predetermined values makes the circuit more complex and, therefore, potentially more unreliable, particularly as the signals from the hand held remote control unit are electromagnetic. Moreover, since only three packets of data are used to analyze the desired direction of rotation and position, clearly, the user must input the desired amount of angular rotation in advance. If the user desires to adjust the tilt slightly after the first step then he or she must re-enter a new amount of tilt.

The blades of most common blinds are tilted either by a pair of cords extending from a head assembly at the top sash of a window or by means of a wand that extends from the head assembly at one side of the window. Most are of the latter type. U.S. Pat. No. 4,550,759 issued to Archer discloses a set of blinds controlled by a wand with a motor coupled thereto. The device uses a slip clutch at the output of the motor to avoid over-torquing the gears in the gear box attached to the motor when the device is operated manually. Stops affixed to the output shaft of the slip clutch define the fully open and fully closed positions of the blinds. The motor is activated for a predetermined time interval which corresponds to the full opening of the blinds from a fully closed position and vice versa. Should the blinds be in an intermediate starting position, then the slats or blades reach a fully closed or open position before the predetermined time interval is over. In this case the slip clutch allows the motor to run until the interval is over. Not only does the use of gears, stops and a slip clutch make the Archer device relatively expensive to manufacture but the use of stops requires alignment of the position of the stops and pin to correspond with the extreme positions of the blade tilt.

SUMMARY OF THE INVENTION

According to the invention there is provided a device for controlling the tilt angle of the blades of window blinds of a type having a head rail and a tilt control mechanism, in the head rail which includes a motor mounted externally of the head rail having an output shaft and a slip clutch mounted externally of the head rail coupled to the output shaft of the tilt control mechanism. The slip clutch is coupled to the output shaft from the tilt control mechanism and upon reaching a limit of tilt of the window blinds decouples the output shaft of the tilt control mechanism from that of the clutch. A receiver and demodulator is positioned to receive a carrier signal modulated with coded pulses and to demodulate the carrier to produce corresponding electrical pulses. A power device supplies power to the receiver and demodulator. A decoder has an input coupled to an output of sa receiver and demodulator for providing an output on one of a plurality of output lines depending upon the coding of pulses from receiver and demodulator. A motor driver circuit has an input coupled to the decoder and an output coupled to the motor, and is operative to drive the motor in either a forward or reverse direction depending upon the output from the decoder.

A power control means may be coupled to the power controller and to an output of the receiver and demodulator and is operative to connect power to the receiver and demodulator at predetermined intervals of time. A signal stretching circuit may be coupled to an output of the receiver and demodulator and may be operative upon detecting a carrier signal to connect power to the decoder for a time sufficient to receive all subsequent data signals in a string of data signals.

Preferably, the slip clutch may be a flexible tube connected at one end to the motor shaft and at the other end to the tilt control mechanism such that upon a blind blade reaching a tilt of maximum extent, the tube slips over the tilt control mechanism due to the increased resistance of the tilt control mechanism to further rotation.

The receiver and demodulator and decoder are normally without electrical power but the power means provides electrical power to the receiver and demodulator for predetermined periods of time at predetermined intervals of time. Upon detection of a carrier signal, the power means provides electrical power to the decoder so that the decoder can decode signals detected by the receiver and demodulator and extends the time during which power is supplied to the receiver and demodulator until such time as power is removed from the decoder.

The power control means may include a switch intermediate a power source and a power input of the receiver and demodulator and a timing circuit having a first output coupled to the switch. The timing circuit having a first output coupled to the switch may be operative to provide a power on pulse to the switch so as to cause said switch to close and apply power from the power source to the power input of the receiver and demodulator and, at end of the power on pulse to cause the switch to open and remove power from the power input.

The power control means may include a pulse stretching circuit having an input coupled to an output of the receiver and demodulator and an output coupled to both a decoder power supply switch and a timing circuit grounding switch. In response to receiving a signal from the receiver and demodulator the pulse stretching circuit is operative to close both the decoder power supply switch and the timing circuit grounding switch.

The device may include a motor driver circuit and a current sensing resistor and driving circuit disabling circuit to disable the driving circuit upon detecting an overload current in the current sensing resistor.

The incoming carrier signal may be pulse position modulated.

BRIEF DESCRIPTION OF THE DRAWINGS

The invention may be best understood by reference to the detailed description which follows, in conjunction with the accompanying drawings, where:

FIGS. 2*a* to 2*d* are wave forms of pulses from the hand held remote infra red transmitter;

DETAILED DESCRIPTION WITH REFERENCE TO THE DRAWINGS

Figure 1:
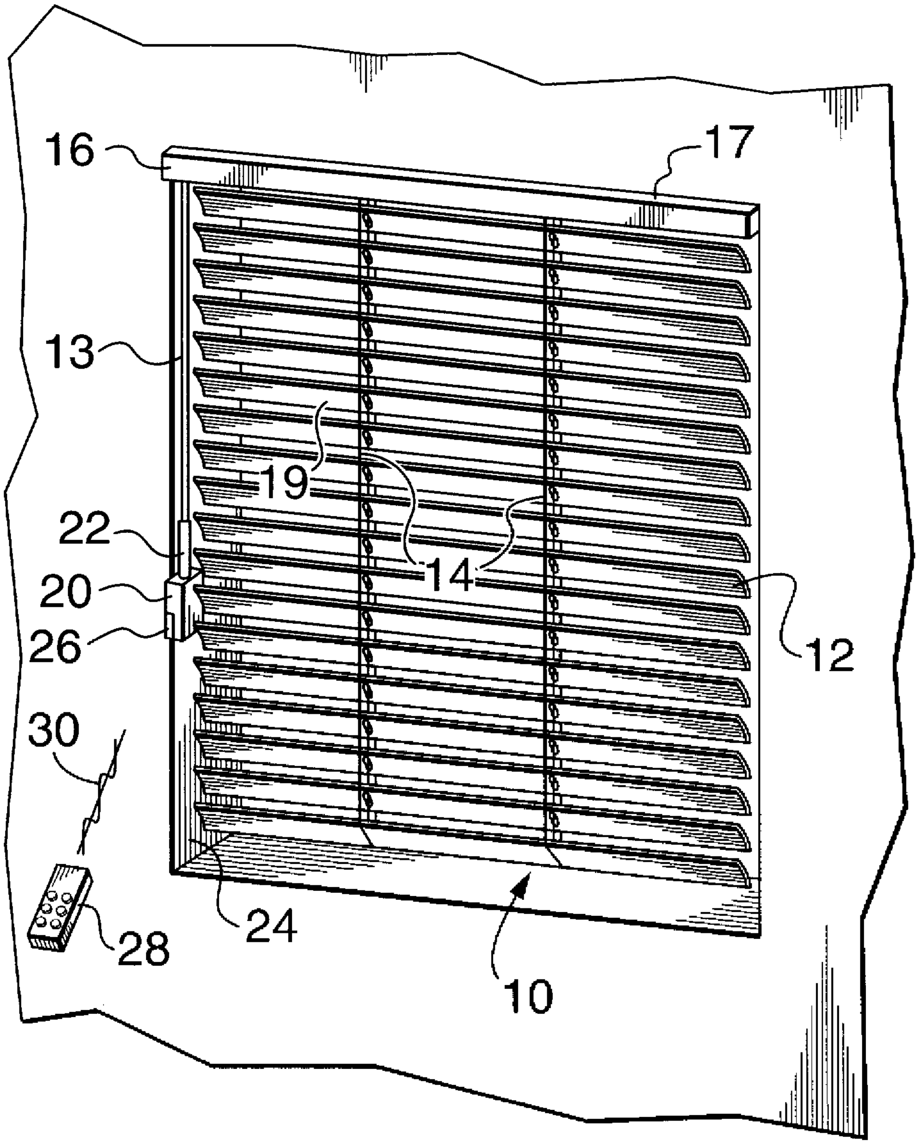
FIG. 1 is a perspective view of a window with venetian blinds and the blind controller installed to control the tilt of the blades of the blind.

Referring to FIG. 1 there is shown a set of venetian blinds 12 installed in a window 10 of a type having a wand 13 extending down from a head assembly 16 fastened to the top window sash 17. Ladder strings 14 extend vertically along either side and are attached to the slats or blades 19 at either edge so that they force all of the blades to tilt together. A controller 20 is affixed to the side sash 24 of the window 10 and is coupled by a polyethylene tube 22 to the wand 13. An infra red window 26 permits the reception of infra red pulses 30 from a hand held remote control unit 28.

The controller 20 contains a D.C. motor 118 (see FIG. 4) having an output shaft to which tube 22 is attached. The tube 22 is sized so that it grips wand 13 tightly enough so that as the motor output shaft rotates, the tube 22 causes wand 13 to rotate. Once wand 13 reaches an extreme position in which the blades 19 are either fully open or fully closed, a motor control circuit shown in FIG. 4 detects this condition and shuts off current to the motor 118. However, if there is a failure of the shut off circuitry, tube 22 simply slips over wand 13 and/or the motor output shaft, thereby avoiding damage to the motor 118. The hand held remote control unit 28 has buttons which select the coding of pulses to be transmitted. Depending upon the setting of each controller 20 a given code will access a particular controller and motor combination. It is possible to have a given code operate more than one controller and motor. Pressing the appropriate button on the hand held unit 28 causes a coded train of infra red pulses 30 the wave forms for which are shown in FIG. 2 to be emitted.

The pulses carried by the infra red wave from the remote controller 28 as shown in FIGS. 2*a* to 2*d* consist of a 9 millisecond (ms) 38 kilohertz carrier pulse train followed by 4.5 ms of no output, which, in turn, is followed by a coded pulse train. The pulses are coded by pulse position modulation in which "1" and "0" are differentiated by the time between pulses as shown in FIG. 2*c*. Initially a carrier signal at 38 kHz for 9 ms in duration is sent followed by 4.5 ms dead time in which there is no transmission. Finally coded pulses are sent in which a 1.125 ms interval between pulses corresponds to a "0" and a 2.25 ms interval corresponds to a "1". The pulses are sent in 8 bit groups with the two first bytes corresponding to the custom code which identifies the hardware being addressed. The next byte is an 8 bit data byte followed by 8 bits of the latter data inverted. Each pulse as shown in FIG. 2*c* consists of a time segment of the 38 kHz carrier train (see FIG. 2*d*).

Figure 3:
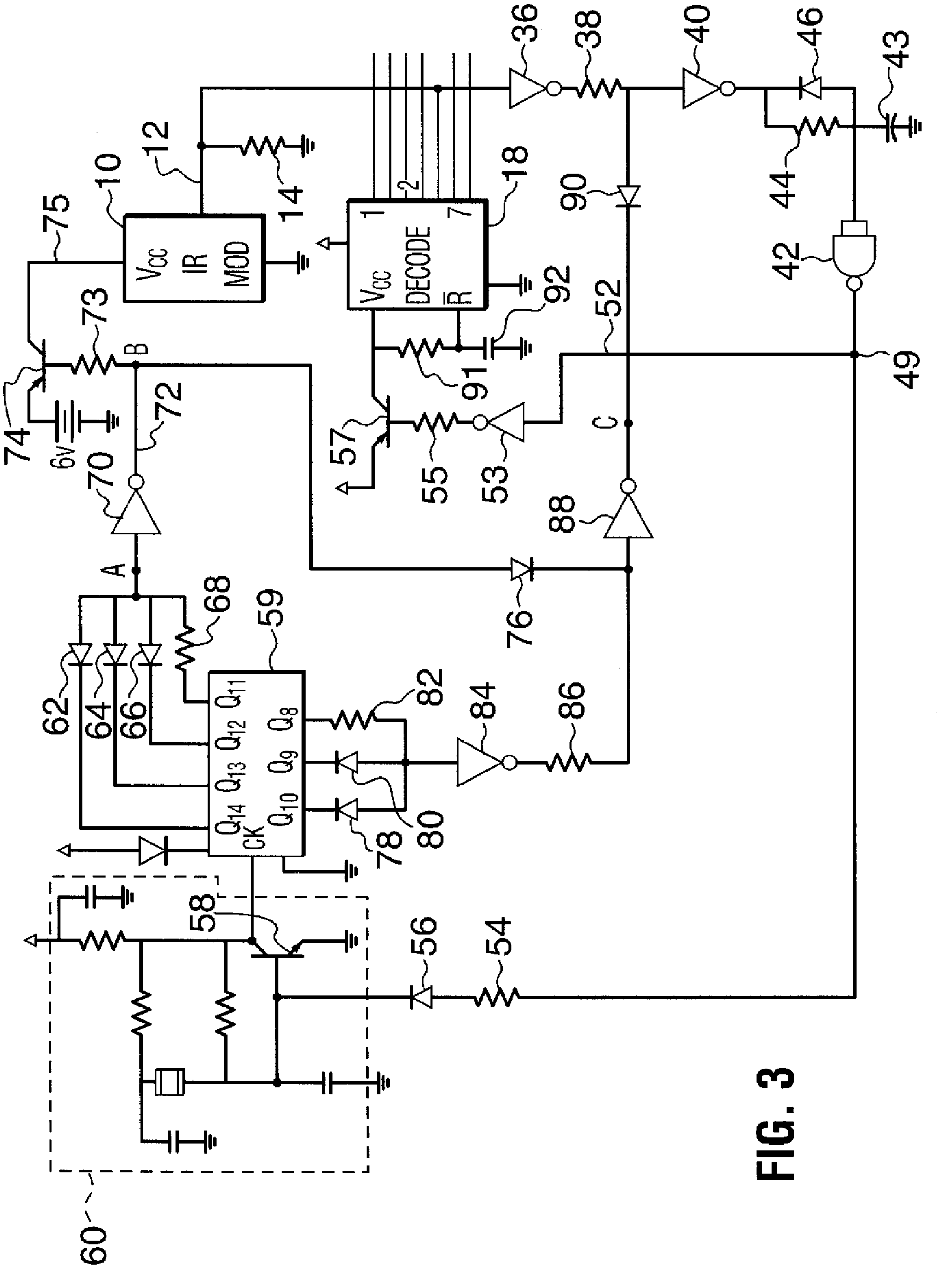
FIG. 3 is a circuit diagram of the electronic control circuit which receives the pulses from the hand held remote and drives the motor which controls the tilt of the blind blades.

Referring to FIG. 3 there is shown the circuitry used to receive the pulses transmitted by the remote 28 (shown in FIG. 1). Infrared Module 10 is the receiver and demodulator which functions to receive the transmitted signal 30 (shown in FIG. 1), demodulates it and outputs the demodulated signal pulses onto line 12. Resistor 14 is 470 kilohms and establishes a high impedance to ground. When module 10 is receiving an unmodulated 38 kHz signal in the form of an infrared wave the output goes low. The output goes low and high when it receives a 38 kHz signal that is pulse modulated by a pulse position modulated digital data string. The demodulated digital data is output onto line 12 and conducted by line 16 to a decoder 18. Assuming the decoder 18 is powered on, when a valid signal is decoded by the decoder 18, it drives one of a possible fourteen outputs 220, 221; 222, 223; . . . ;232, 233 depending upon the code detected. For example, for a particular pair of codes, lines 220 and 221 would be selected. If the user wishes to use these codes for a particular controller 20 (see FIG. 1), then the user would connect the motor control circuitry lines F and B of FIG. 4 to lines 220 and 221, respectively.

Figure 5:
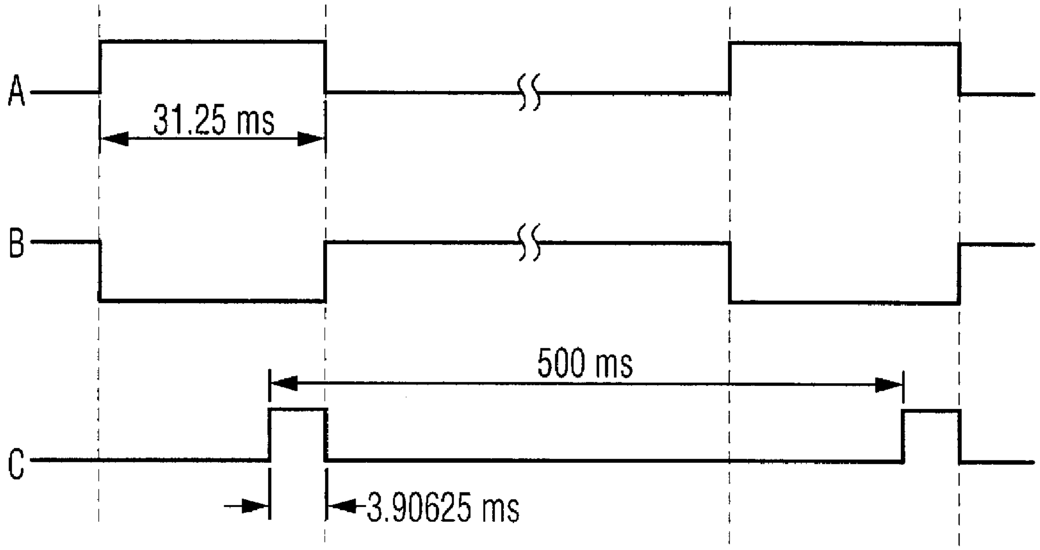
FIG. 5 is a wave form diagram showing the wave forms of the portion of the circuit of FIG. 3 which controls the power to the IR module.

A timing block consists of counter 59, inverters 70, 84, and 88 and crystal controlled oscillator 60. The output from the oscillator 60 provides the clock input of 14 bit binary counter 59. The outputs Q12, Q13, and Q14 of counter 59 are applied to the cathodes of diodes 66, 64, and 62 while that of Q11 is applied through resistor 68 to terminal A which forms the input to inverter 70. The effect of the diodes 66, 64, and 62 and resistor 68 is to apply a logic AND to the outputs Q11 to Q14. For example, a low on any one of the outputs Q11 to Q14 will result in a low to the input of inverter 70 and a high on all of the outputs Q11 to Q14 will result in a high to the input of inverter 70. The resulting output on line 72 (point B) which is low if A is high turns on transistor 74 by driving current through resistor 73 and applies the 6 volts from battery 71 to the power supply input Vcc on line 75 less the emitter-collector voltage drop across transistor 74. The resulting wave form at A and B is shown in FIG. 5 and consists of a 31.25 ms pulse every 500 ms which powers module 10.

The outputs Q8, Q9, and Q10 are applied to a logic AND circuit consisting of diodes 78, 80, and 82. A resulting positive pulse is inverted by inverter 84 to give a 3.90625 ms negative pulse every 31.25 ms. This signal and the output of inverter 70 are applied to a logic OR circuit consisting of diode 76 and resistor 86. The input to inverter 88 does not go low until both the output of inverter 84 and the output of inverter 70 are both low. The resulting positive pulse, of 3.90625 ms every 500 ms, from inverter 88 stops diode 90 from clamping the input to inverter 40 allowing signals to propagate through. Any pulses on line 12 are input through inverters 36 and 40 to a pulse stretching circuit consisting of resistor 44, capacitor 43, and diode 46 and Nand gate 42. The output of inverter 40 is normally high, with capacitor 43 normally charged and the output of Nand gate 42 being normally low. Upon arrival of a low signal from line 12 after passing through inverters 36 and 40, the output of inverter 40 goes from its normally high state to a low one, discharging capacitor 43 through diode 46 and inverter 40. The output of Nand gate 42 goes from low to high and stays there until the input to Nand gate 42 charges up to a voltage close its maximum. At that point Nand gate 42 switches off and drops the voltage at its output. The resistance 44 in combination with the output impedance of inverter 40 and the capacitance of capacitor 43 establishes the RC charging time constant for capacitor 43. This value is set so that Nand gate 43 takes about 44 msec. to switch off after switching on. If the output of the inverter 40 goes low again before the end of the duration, the capacitor 43 is again discharged thereby resetting the timing and the output of Nand gate 42 remains high.

When the output on line 49 of the pulse stretching circuit goes high, it not only powers up the decoder 18 to enable it to decode incoming signals but it also overrides the timing block by stopping the oscillator 60. This is accomplished by turning on transistor 58 via resistor 54 and diode 56. With the oscillator stopped, the output of inverter 70 is locked on at a low value causing module 10 to remain powered. The decoder 18 is powered and diode 90 remains off so that signals can propagate from module 10 to the pulse stretching circuit. This powering of the decoder 18 and the receiver and demodulator 10 is maintained as long as pulses or a low level signal corresponding to an unmodulated carrier are being output on line 12. Once the signals stop, it takes about 44 msec for capacitor 43 to recharge to the point that Nand gate 42 switches its output on line 49 low and turns off the decoder 18 and activates the oscillator 60. Once the pulse stretching circuit output on line 49 goes low, the timing block resumes control with clock pulses at the rate of 32.768 kHz being input to the clock input of counter 59.

The duration of the output of the pulse stretching circuit being high is set to around 44 ms so that even with variations of component values and the threshold voltage, it is always at least 31.25 ms long which is the blanking period between each data string. This ensures that the next data string is received and demodulated fully by the module 10.

Figure 6:
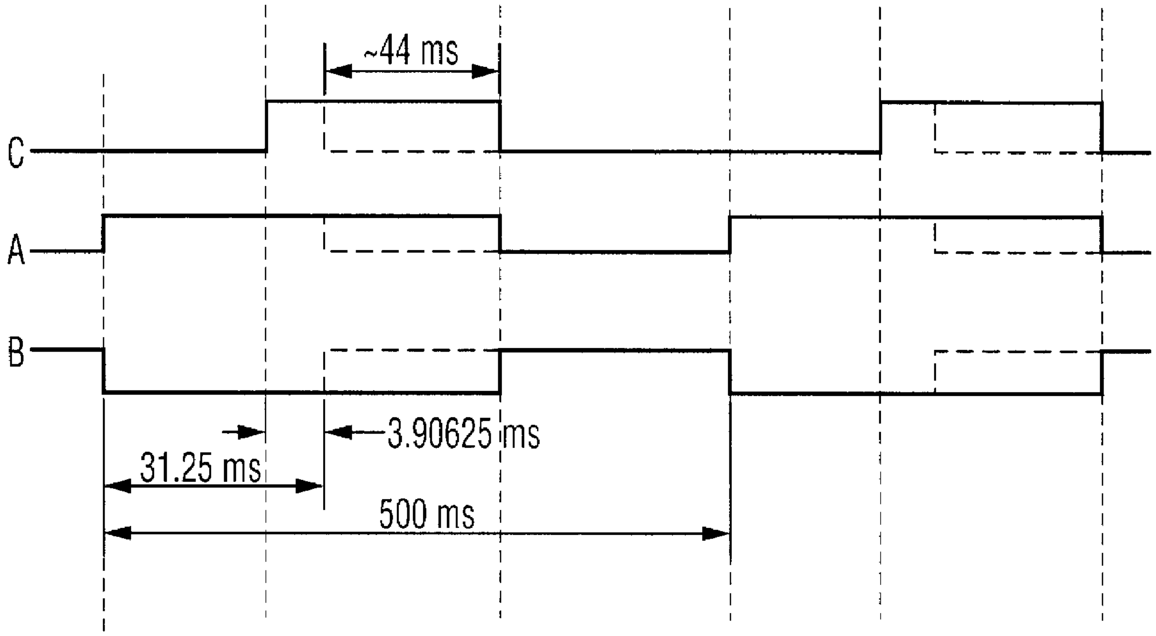
FIG. 6 is a wave form diagram showing the wave forms of FIG. 5 herein when a signal is detected by the receiver and demodulator.

Referring to FIG. 6, the effect of detecting an unmodulated carrier signal or a pulse position modulated carrier is seen in FIG. 6. If during the 3.90625 ms signal at C, the output on line 12 goes low, since diode 90 is blocked, the output of inverter 40 goes low and that of 42 goes high and turns on the decoder 18, stops the oscillator 60, maintaining the signal B low and locking on the power to receiver and demodulator 10. This condition is maintained for about 44 msec after the pulse is detected if no further pulses are detected by the receiver demodulator 10 as seen by the waveforms shown in FIG. 6 or, if further pulses are detected thereafter, for 44 msec after the last pulse is detected. Thus, the decoder 18 and the receiver and demodulator 10 stay on as long as a carrier signal is being detected by receiver and demodulator 10 and for about 44 msec after the last pulse is detected.

Figure 4:
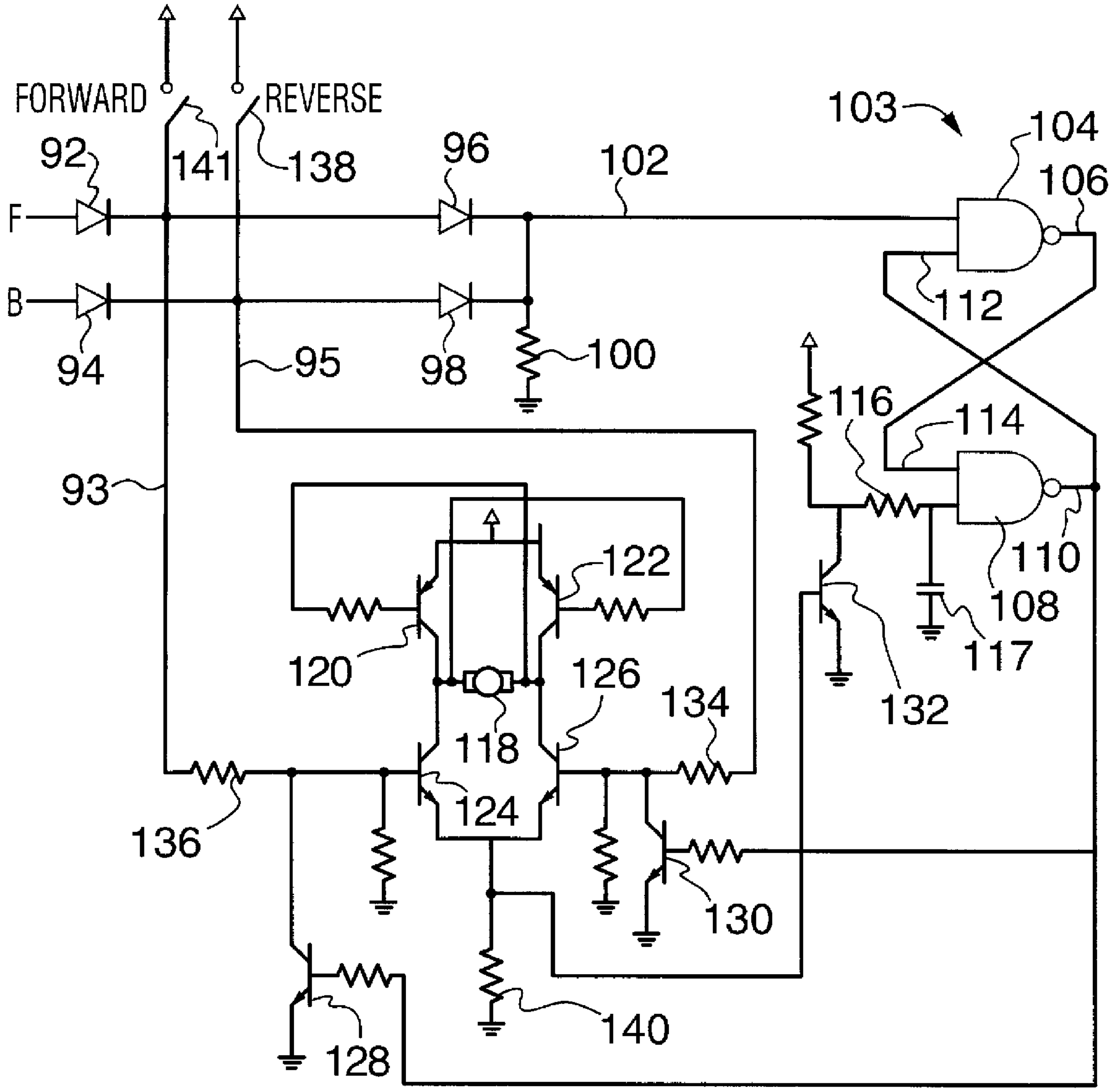
FIG. 4 is a circuit diagram showing the motor control circuit.

The motor control block shown in FIG. 4, is driven on lines F and B by one set of the 7 pairs of outputs from the decoder 18 (see FIG. 3). Both outputs are coupled by diodes 97 and 94 to lines 93 and 95 which are coupled by resistors 136 and 134 to the base of transistors 124 and 126 respectively. Transistors 120, 122, 124 and 126 are connected in a bridge arrangement with motor 118 driven between the collectors of transistors 120 and 126 and 122 and 124. The collector of transistor 126 is coupled to the base of transistor and the collector of transistor 124 is coupled to the base of transistor 122.

A flip flop 103 formed by NAND circuits 104 and 108 have one input coupled by line 102 to the cathodes of diodes 96 and 98. Another input on line 115 is coupled to two resistors in series to the positive supply voltage. The collector of transistor 132 couples line 115 to ground through resistor 116. The base of transistor 132 is coupled to a current sensing resistor 140 that couples the emitter of transistors 124 and 126 to ground. Transistor 128 connects the base of transistor 124 to ground and transistor 130 connects the base of transistor 126 to ground. The bases of transistors 128 and 130 are both connected by line 116 to the Q' output of the flip flop 103.

A pair of momentary buttons 138 and 141 couple lines 93 and 95, respectively, to the supply voltage. They function as manual switches to operate the motor either in the forward or reverse direction.

When one of the outputs F and B go high, say F, it drives transistor 124 on which, in turn, drives on transistor 122. This causes current to flow through the motor 118 and resistor 140 and results in the motor 118 turning. When the other output goes high, the transistors 120 and 126 turn on causing current to pass through the motor 118 in the opposite direction and the motor 118 to reverse. Resistor 140 senses the current flowing through the motor 118. When the tilt of the blade of a blind hits the end, it is stopped mechanically. This causes the motor to conduct excessive current and the current through resistor 140 to increase. The increased voltage across resistor 140 turns on transistor 132 lowering the voltage on line 115 below its threshold voltage after a time delay which is determined by the timing components 116 and 117 and causing the Q' output of the flip flop 103 to go high. This drives on transistors 128 and 130 which turns off transistors 124 and 126, respectively, and stops current from flowing through the motor. The state of the flip flop 103 remains the same until the control line F or B returns to low voltage.

By powering the receiver and demodulator for only 31.25 ms for every 500 ms of time, the power on has a duty cycle of only about 6% and, by powering the decoder 18 only upon detecting from the receiver and demodulator 10 and, consequently, a great deal of power is conserved.

It will be appreciated that there is no need to preprogram the hand held remote unit 28 to set the desired angle of tilt. A user simply keeps pressing the proper tilt button until the desired amount of tilt has been achieved. Moreover, in the event-of an error in the code, the unit will recover when it receives the next cycle of data in the string of data pulses being transmitted. In the event of tilting the blades to an extreme position, there are two levels of protection against overheating of the motor. Should the one based on detecting an overcurrent through resistor 140 for some reason fail, then the mechanical slip clutch comprising tube 22 will take over.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A device for controlling the tilt angle of window blinds of a type having a head rail and a tilt control mechanism in the head rail, comprising:

(a) a motor mounted externally of said head rail and having an output shaft;

(b) a slip clutch mounted externally of said head rail, coupling said output shaft to said tilt control mechanism and operative to slip and decouple said output shaft from said tilt control mechanism upon reaching a limit of tilt of said window blinds;

(c) a receiver and demodulator positioned to receive a carrier signal modulated with coded pulses and to demodulate the carrier to produce corresponding electrical pulses;

(d) a power device coupled to said receiver and demodulator operative to provide electrical power to said receiver and demodulator;

(e) a decoder coupled to an output of said receiver and demodulator for providing an output on one of a plurality of output lines depending upon the coding of pulses from said receiver and demodulator; and (f) a motor driver circuit having an input coupled to said decoder and an output coupled to said motor, operative to drive said motor in either a forward or reverse direction depending upon the output from said decoder.

2. A device according to claim 1, including a power controller coupled to said power device and to an output of said receiver and demodulator and operative to connect power to said receiver and demodulator at predetermined intervals of time and a signal stretching circuit coupled to an output of said receiver and demodulator and operative upon said receiver and demodulator detecting a carrier signal to connect power to said decoder for a time sufficient to receive all subsequent data signals in a string of data signals.

3. A device according to claim 1, including a wand and wherein said slip clutch is a flexible tube connected at one end to the motor output shaft and at the other end to said wand such that upon a blind blade reaching a tilt of maximum extent, said tube slips over one of said wand and the motor output shaft due to the increased resistance of said wand to further rotation.

4. A device according to claim 1, wherein said receiver and demodulator and said decoder are normally without electrical power but said power device provides electrical power to said receiver and demodulator for predetermined periods of time at predetermined intervals of time and, upon detection of a carrier signal, provides electrical power to said decoder so that said decoder can decode signals detected by said receiver and demodulator and extends the time during which power is supplied to said receiver and demodulator until the time at which power is removed from said decoder.

5. A device according to claim 2, wherein said power controller includes a switch intermediate a power source and a power input of said receiver and demodulator and a timing circuit having a first output coupled to said switch, said timing circuit operative to provide a power on pulse to said switch so as to cause said switch to close and apply power from the power source to said power input and, upon the end of said power on pulse to cause said switch to open and remove power from the power source being applied to the power input.

6. A device according to claim 5, wherein said power controller includes a pulse stretching circuit having an input coupled to an output of said receiver and demodulator and an output coupled to both a decoder power supply switch and a timing circuit grounding switch, said pulse stretching circuit operative in response to receiving a signal from said receiver and demodulator to close both said decoder power supply switch and said timing circuit grounding switch.

7. A device according to claim 1, including a motor driver circuits, a current sensing resistor and a disabling circuit to disable said driving circuit upon detecting an overload current in said current sensing resistor.

8. A device according to claim 1, wherein said incoming carrier is pulse position modulated by a digital data string of pulses.

9. A device according to claim 8, wherein said carrier has a frequency of 38 kilohertz.

10. A device for controlling the tilt angle of blades of window blinds of a type having a wand for effecting this control, comprising:

(a) a motor having a motor output shaft;

(b) a resilient tube coupled at one end to said wand and at another end to said motor output shaft and dimensioned so as to rotate said wand when the tube is rotated and to slip over said wand and said motor output shaft when said wand is blocked from rotation and said motor continues to run;

(c) a motor driving circuit coupled to said motor and operative to drive said motor in either a forward or reverse direction;

(d) a receiver and demodulator having an input window exposed to an incoming coded infra red signal; and (e) a decoder having an input coupled to said receiver and demodulator and a plurality of pairs of outputs, with each pair couplable to said motor driving circuit in response to associated command codes contained in pulses from said receiver and demodulator.

11. A device according to claim 10, wherein said pulses are pulse position modulated.

12. A device according to claim 10, including a power control circuit having a timing circuit operative to generate a power on pulse on a first output thereof and a switch coupled to a power input to said receiver and demodulator and to said second output and operative to close in response to said power on pulse and to open at an end thereof.

13. A device according to claim 12, including a pulse stretching circuit having an input coupled to said receiver and demodulator and an output coupled to both a decoder power supply switch and an oscillator grounding switch, operative in response to signals received from said receiver and demodulator to close said decoder power supply switch and said oscillator grounding switch thereby maintaining said switches in a closed condition until no signals are received from said receiver and demodulator within a pre-established time interval after a last signal has been received.

14. A device according to claim 10, wherein said motor driving circuit is a bridge network of transistors coupled to said motor and having a sensing resistor and a control circuit coupled to said sensing resistor and operative to disable said bridge circuit and stop current from passing through said motor in response to an excessive amount of current passing through said sensing resistor.

* * * * *